(12) United States Patent
Philipp et al.

(10) Patent No.: US 8,794,422 B2
(45) Date of Patent: Aug. 5, 2014

(54) PRODUCT DISCHARGE LINE

(75) Inventors: Kurt Philipp, Grenzach-Wyhlen (DE); Martin Burger, Dattwil (CH)

(73) Assignee: Rotzinger AG, Kaiseraugst (CH)

( * ) Notice: Subject to any disclaimer, the term of this patent is extended or adjusted under 35 U.S.C. 154(b) by 171 days.

(21) Appl. No.: 13/254,276

(22) PCT Filed: Mar. 1, 2010

(86) PCT No.: PCT/EP2010/052563
§ 371 (c)(1),
(2), (4) Date: Sep. 1, 2011

(87) PCT Pub. No.: WO2010/100117
PCT Pub. Date: Sep. 10, 2010

(65) Prior Publication Data
US 2011/0315525 A1    Dec. 29, 2011

(30) Foreign Application Priority Data

Mar. 3, 2009   (CH) ........................................ 313/09

(51) Int. Cl.
*B65G 47/53*   (2006.01)

(52) U.S. Cl.
USPC .................................... 198/347.1; 198/347.3

(58) Field of Classification Search
CPC combination set(s) only.
See application file for complete search history.

(56) References Cited

U.S. PATENT DOCUMENTS

| 5,094,337 | A | * | 3/1992 | van Veldhuisen et al. .... | 198/357 |
| 6,170,635 | B1 | * | 1/2001 | Rommelli ..................... | 198/429 |

FOREIGN PATENT DOCUMENTS

| DE | 1 556 704 | 2/1970 |
| EP | 0 395 178 | 10/1990 |
| EP | 0 879 774 | 11/1998 |
| JP | 03 021382 | 1/1991 |
| JP | 7 267353 | 10/1995 |
| WO | 2008 034482 | 3/2008 |

OTHER PUBLICATIONS

International Search Report issued Apr. 20, 2010 in PCT/EP10/52563 filed Mar. 1, 2010.

* cited by examiner

*Primary Examiner* — Gene Crawford
*Assistant Examiner* — Lester Rushin
(74) *Attorney, Agent, or Firm* — Oblon, Spivak, McClelland, Maier & Neustadt, L.L.P.

(57) ABSTRACT

A module conveying device including a main conveying mechanism conveying products in a main conveying direction between an input location and an output location of the main conveying mechanism. The output location can be swiveled between two vertically arranged first transfer positions. A transverse mechanism accepts the conveyed products that likewise includes an input location and an output location, which input location is positioned in one of the two first transfer positions and the output location of the transverse conveying mechanism is positioned in a second transfer position. The output location of the main conveying mechanism can be swiveled between at least one additional first transfer position and the two first transfer positions. Each additional first transfer position is positioned in the event of one input location of an additional transverse conveying mechanism. The additional output locations of the additional transverse conveying mechanism are positioned in additional transfer positions arranged vertically to the second transfer position. The conveying device also includes a collecting conveying mechanism, including an input location and an output location, that can be positioned selectively between the transfer positions of the transverse conveying mechanism to accept products temporarily stored on a transverse conveying mechanism.

15 Claims, 4 Drawing Sheets

PRODUCT DISCHARGE LINE

The present invention relates to a modular conveying device according to the preamble of the independent patent claim 1 and to a corresponding method.

DESCRIPTION

From the prior art, conveyors for conveying and redistributing products are known which are used in particular in the production of chocolate bars, biscuits or other foodstuffs. Here, for example, chocolate bars arranged in rows are accepted on a conveyor in transverse direction by a production station, for example of a chocolate molding machine, and are transported in the longitudinal direction to one or more packaging machines. The production output during the chocolate bar production determines the spacing of the product rows to each other.

From the unexamined German patent application DE 1556704, a device is known for rearranging elongated bar-shaped parts from a positioning in groups on one conveyor belt into a positioning in rows on another conveyor belt which is arranged transverse to the first conveyor belt. The first conveyor belt is configured as length-adjustable endless belt, wherein during depositing the products groups, the transversely arranged belt has to be stopped. A disadvantage of this device is that the product flow has to be interrupted for a short time which has a disadvantageous effect when loading the packaging machine arranged downstream.

From document WO/2008/034482, a device and a method are known for transferring a group of products from an input conveyor via a transfer conveyor to an output conveyor. By means of a slicer, product slices, for examples slices of cheese, sausage or ham are conveyed mostly in a continuous row from the input conveyor to the transfer conveyor and are conveyed by the latter above the output conveyor and, by swiveling the transfer conveyor, are deposited in rows onto the output conveyor. Here, the transfer conveyor is intended to serve, so to speak, as collecting station in the region of which a group of successively incoming food products is first collected in order to subsequently transfer them all at the same time to the output conveyor. This device has the disadvantageous effect that during the transfer of the products from the collecting station onto the output conveyor, the collecting station can no longer be loaded with products of the input conveyor so that delays occur during the product supply.

Furthermore, conveying devices are known with which products, which are transported in transverse rows on a swivelable input conveyor in a main conveying direction, are deposited on a transverse conveyor which conveys the products to a packaging station. During emptying the transverse conveyor, the input conveyor is swiveled into its initial position in order to transfer succeeding product rows in the main conveying direction to a downstream conveyor. Usually, a depositing plate for receiving the products from the input conveyor is arranged upstream of the transverse conveyor or transverse discharge belt, wherein the products are pushed by means of a pusher onto the transverse conveyor. This device has the disadvantageous effect that the product row is first pushed by means of the pusher over a significantly larger distance onto the transverse discharge belt and is then accelerated in the direction of the subsequent processing station, for example, of a packaging machine. This process is very time-consuming so that correspondingly larger gaps are created between successive product rows. However, these gaps have to be closed again with additional devices so as to harmonize the product supply to the packaging machine.

Document EP 0395178 A discloses a method and a device for transferring piece goods from a first conveyor onto a second one which is arranged substantially perpendicular to the first one.

From document DE 19721397 A1, a transfer device is known for objects arriving in transverse rows on a revolving endless belt. It is proposed to arrange downstream of the endless feed belt, on the one side of the latter, a forwarding belt working in the same conveying direction and to arrange on the other side, a discharge belt conveying perpendicular to the conveying direction and arranged outside of the plane of the feed belt. A transfer mechanism is provided between feed belt and discharge belt and is driven by a swivel drive to be movable back and forth between a connection to the feed belt and a connection to the discharge belt. Said transfer mechanism can be swiveled about an axis which extends transverse to the conveying direction. Said transfer mechanism is formed as a plane, plate-shaped element, the axis of which extends transverse to the conveying direction and is arranged upstream of the end of the feed belt and above the conveying plane of the feed belt in such a manner that the plate-shaped element of the transfer mechanism can be swiveled relative and close to the end of the feed belt thereby forming a tilt angle or a drop height between feed belt and plate-shaped element. The transfer mechanism has a slider that can be actuated back and forth and is stationarily mounted. However, the device has the disadvantage that the mechanical coupling of the plate-shaped element or the depositing plate to the feed belt is highly stressed specifically during high production rates. Due to the tilting and swiveling movement, it is not always possible to rearrange the products in a gentle manner which, for example, can result in that chocolate bars are damaged and have to be sorted out.

It is therefore an object of the present invention to provide a modular conveying device for redistributing products, which conveying device has a temporary storage effect and does not have the disadvantages of the prior art. In particular, the product flow from production to processing, for example packaging, is to be carried out in a continuous manner so that, for example, each packaging machine is continuously supplied with products to be packaged coming from the product flow. By means of the conveying device according to the invention, short processing distances between the stations are to be achieved. It is a further object of the present invention to supply at least one, preferably a plurality of packaging machines with products while keeping the distances short and/or the cycle rates high.

According to the present invention, these objects are achieved in particular by the elements of the independent claims. Further advantageous embodiments arise in addition from the dependent claims, the description and the figures.

The objects of the invention are in particular achieved by a modular conveying device comprising a main conveying means for conveying products in a main conveying direction between an input location and an output location of the main conveying means, wherein the output location of the main conveying means can be swiveled between two vertically arranged first transfer positions, wherein the conveying device comprises a transverse conveying means for accepting the conveyed products that likewise comprises an input location and an output location, wherein the input location of the transverse conveying means is positioned in one of the two first transfer positions and the output location of the transverse conveying means is positioned in a second transfer position, wherein the output location of the main conveying means can be swiveled between at least one additional first transfer position and the said two first transfer positions, wherein each additional first transfer position is positioned at in each case one input location of an additional transverse conveying means, wherein each of the additional output locations of the additional transverse conveying means are positioned in additional transfer positions arranged vertically to the said second transfer position, wherein the conveying device comprises a collecting conveying means having an input location and an output location, wherein the collecting conveying means can be positioned selectively between the said transfer positions of the transverse conveying means in order to accept products temporarily stored on a transverse conveying means. The conveying means arranged transverse to the main conveying direction are also designated as transverse discharge conveyor, transverse discharge conveying means, transverse conveying belts, product discharge belts or product discharge conveying means. The main conveying means is also designated as distributing conveying means or distributing conveyor.

One of the advantages of the invention is that from the continuous product flow, a first row of products can be transferred onto a first of, for example, two conveying means arranged transverse to the distributing conveying means, or in other words, two transverse conveying means, and subsequently, a row of products following on the distributing conveying means can be transferred onto a second, transversely arranged conveying means. In the meantime, the products on the first conveying means are already accepted by the collecting conveying means. As soon as the last product of this row is placed on the collecting conveyor, the latter can be swiveled by a swiveling movement to the height of the second conveying means so that the row of products temporarily stored there can also be accepted by the collecting conveying means. This results in a continuous product flow which allows an ongoing and uninterrupted further processing of the products, for example by means of a packaging machine. Product rows which can not be transferred or temporarily stored onto one of the two conveying means arranged transverse to the distributing conveying means because, for example, the packaging machine broke down are accepted by the conveying means that follows in the conveying direction.

A further advantage of the invention is that a plurality of conveying means arranged transverse to the conveying direction of the distributing conveyor can be arranged. This makes it possible to stock a first, second, third or a fourth row of products from a plurality of rows taken out of the product flow onto these transverse discharge conveying means. Once the transverse discharge conveying means are emptied, this process can be repeated again. The distributing conveyor can load, e.g., first the lowermost transverse discharge conveying means, then the next one thereabove etc. and starts again at the lowest one as soon as it is emptied. However, any desired order of loading can be provided. The product rows slide with sufficient speed onto the transverse discharge conveying means and are aligned at a retractably configured product limit stop in order to be subsequently transported via a collecting conveying means toward a packaging machine.

Another advantage of this invention is in addition that two packaging machines are loaded which are arranged laterally of and approximately opposite to the distributing conveying means. Here, both packaging machines can be stocked in each case with one product row, wherein in such an arrangement, four transverse discharge belts are arranged approximately one above the other. Preferably, the respective packaging machines are each loaded by the respective two lower or the respective two upper transverse discharge means. This arrangement is advantageous because as a result of this, the collecting conveying means have to carry out the shortest possible swiveling travel. However, it is possible that the free belt catch of a collecting conveying means can reach four or more transverse discharge belts by vertical swiveling. In order to be able to load the two packaging machines continuously and gapless with high speed, it must be possible to stock at least one row of products on the transverse discharge belts or transverse discharge conveying means. It is important here that stocking can be carried simultaneously with the discharge of the previous row so that only a minimal gap between successive product rows is generated.

A further advantage of the conveying device according to the invention is that the at least one packaging machine can be loaded in a highly dynamic manner because the row of products following in each case is already in alignment with the packaging machine and ready for discharging. This means, as soon as the one row has left the respective transverse discharging belt, the following row can be loaded onto the swivelably arranged collecting conveying means. For this, the corresponding swivel drive has to be positioned at the respective next transverse discharging level where the product row is provided for discharging. The gap in the product flow toward the packaging machine created by the swiveling movement is very small because the swiveling travel is only approximately 60 mm and the movement is carried out by a dynamically controlled servomotor. Said gap is closed by the collecting conveying means or gap-closing belts in that the row of products following in each case is discharged with a speed that is higher compared to the speed of the preceding row. The gap running toward the packaging machine is detected, e.g., by means of light barriers in the region of the gap closing belts so that all belts downstream of the gap are accelerated for a short time and thus, the following row lying thereon can close the gap to the front row within two acceleration intervals.

The proposed modular conveying device according to the invention is therefore very efficient because the stand-by position of the stocked or temporarily stored rows of products corresponds to the alignment of the machine. Thus, with respect to known solutions, a significant portion of mechanical components such as, for example, the pusher or the depositing plate is eliminated. Moreover, the proposed device is faster because the in each case following row of products can be transported within a very short time toward a packaging machine.

[2] In one embodiment variant of the modular conveying device, each transverse conveying means has an additional second output location, wherein each output location is positioned in a third transfer position, wherein the conveying means in addition to the said collecting conveying means comprises at least one further collecting conveying means having an input location and an output location, and wherein the collecting conveying means can be positioned selectively between the said third transfer positions of the transverse conveying means in order to accept products temporarily stored on a transverse conveying means. One of the advantages of the invention is that by means of a plurality of collecting conveying means it is ensured that two or more processing machines, e.g. packaging machines, can be supplied simultaneously with rows of products. This arrangement has the additional advantage that short transport distances can be implemented. Furthermore, one packaging machine can be used as a replacement machine in the event the packaging machine primarily supplied with products fails. In this case, the products stored on the reversibly operatable transverse conveying means can be immediately transported toward the replacement machine. Thus, the production flow is hardly or not at all affected.

[3] In another embodiment variant of the modular conveying device, the products conveyed by means of the main conveying means are arranged in transverse rows of the length L, wherein each transverse conveying means has at least the length L in order to receive products. One of the advantages of the invention is that the length of the transverse conveyors is configured such that a complete row of products can be received at once and temporarily stored. In order to achieve at the same time a small spacing between the transverse conveying means arranged one above the other, conveying means have been developed which are implemented, e.g., as conveyor belts having an endless belt and having the smallest possible installation height. The width of a respective transverse conveying means is adapted during the fabrication of the transverse conveying means to the size of the product to be transported.

[4] In a further embodiment variant of the modular conveying device, a processing station is arranged downstream of the collecting conveying means and can be connected thereto. One of the advantages of the invention is that the collecting conveying means can be connected directly or by means of a further forwarding belt to a packaging machine. The collecting conveying means is preferably connected in alignment with such a packaging machine. As a result, the rows of products can be accelerated in an optimal manner so that these products, which usually are food products, can be gently transported.

[5] In one embodiment variant of the modular conveying device according to the invention, each transverse conveying is equipped with an independently controllable, reversible drive in order to correspondingly convey temporarily stored products in the direction of the first transfer position or the second transfer position. One of the advantages of the invention is that in particular the transverse conveying means can be individually driven so that a flexible complete system is implemented. The drives are usually configured as electrical servomotors and can be controlled and/or regulated by a programmable logic controller. Moreover, the position of the products on the conveying means can be detected by means of sensor means. Based on the corresponding sensor data, a conveying means can be driven as required. Thus, for example, the collecting conveying means is principally operated with the belt running, wherein it switches over from a transverse conveying means that has just been emptied to a filled transverse conveying means, wherein after reaching the transfer position, the stagnant belt of the transverse conveying means is accelerated so as to transfer the temporarily stored products onto the collecting conveyor. After this, the transverse conveying means is stopped again so as to be able to receive products from the main conveying means. In the meantime, the collecting conveying means is swiveled again to a next filled transverse conveying means.

[6] In one embodiment variant of the modular conveying device, each transverse conveying means can be operated cyclically, wherein within an idle cycle, the products transferred by means of the main conveying means can be temporarily stored and wherein within a conveying cycle, the temporarily stored products can be fed to the corresponding collecting conveying means. One of the advantages of the invention is that the cyclical operation can be adjusted for the products transported on the distributing conveying means, which products are usually arranged in transverse rows and spaced apart from each other. Cyclical operation means that the products can be processed with the existing spacing. The conveying speed can be synchronized with said work cycle. By means of the conveying device, the cyclically produced product rows are to be rearranged into a continuous product flow in rows so that individual products or groups of products can be accepted, for example, by a packaging machine and can be processed in a new, different or own work cycle.

[7] In another embodiment variant of the modular conveying device, each conveying means arranged in transverse direction can be operated cyclically, wherein in an idle cycle, products transferred by means of the distributing conveying means can be temporarily stored and wherein in a conveying cycle, the temporarily stored products can be fed to the corresponding collecting conveying means. One of the advantages of the invention is that the cyclical operation can be adjusted for the products transported on the distributing conveying means, which products are usually arranged in transverse rows and spaced apart from each other. Cyclical operation means that the products can be processed with the existing spacing. The conveying speed can be synchronized with this work cycle. By means of the conveying device, the cyclically produced product rows are to be rearranged into a continuous product flow in rows so that individual products or groups of products can be accepted, for example by a packaging machine, and can be processed in a new, different or own work cycle.

[8] In a further embodiment variant of the modular conveying device, the main conveying means and/or each transverse conveying means and/or each collecting conveying means is configured as rotating, endless band conveyor or belt conveyor. One of the advantages of the invention is that the conveying means or each conveying means has a flat surface for receiving the products, wherein said flat surface can be used as deposit surface and also as transport surface. Through the selection of the belt material, the optimal friction can be adjusted for the products and the necessary accelerations during the operation of the belts. Moreover, band conveyors or belt conveyors can be built in small installation heights which is particularly advantageous here because in particular the transverse conveying means arranged on top of each other are preferably only slightly spaced apart in order to position the transfer positions close to one another. As a result of this, smaller swiveling angles can be implemented for the main conveying means as well as the collecting conveying means.

[9] In another embodiment variant of the modular conveying device, the transverse conveying means or each transverse conveying means is arranged transverse to the main conveying direction. One of the advantages of the invention is that the rows of products coming from the main conveying means are preferably also arranged as transverse rows, wherein the transverse conveying means is aligned in the same manner. As a result, a product row can be gently transferred onto the transverse conveying means. Transversely arranged usually means arranged perpendicular to the main conveying direction. However, depending on the type of products, an arrangement angle of the transverse conveying means that is different from 90 degrees can also be advantageous.

[10] In one embodiment variant of the modular conveying device, two, three or four transverse conveying means are present. One of the advantages of the invention is given by the modular arrangement of the conveying means or transverse conveying means arranged transverse to the main conveying direction, whereby a flexible conveying device can be provided which is adapted to the production quantity at the entrance of the device and the output quantity at the exit of the device. By means of two, three or four transverse conveying means, a large proportion of the produced rows of products can accepted, temporarily stored and transferred to the processing stations, e.g. packaging machines. The number of transverse conveying means per conveying device depends essentially on the production and packaging capacity of a plant.

[11] In a further embodiment variant of the modular conveying device, the main conveying means is configured to be length-adjustable for vertical and/or horizontal positioning at a corresponding first transfer position. One advantage of the invention is that as a result of this, the output location of the main conveying means can be positioned as required within a determinable range of action. Thus, the belt catch or the output location of the main conveying means can be moved away from the predetermined transfer positions for the purpose of, e.g. cleaning, service work or the like. Another advantage is that during the operation of the production plant, disordered rows of products or rows with bad products can be removed from the product flow by means of a retractable belt catch and redirected to a processing station, e.g. a chocolate melting machine or into a waste container, wherein the respective transverse row is transferred onto a transverse conveying means specifically provided for this purpose. Said retractable belt catch of the main conveying means is equipped with an independently controllable drive provided for this purpose. The main conveying means can be implemented, e.g. as a vertically swivelable telescopic belt conveyor.

[12] In another embodiment variant of the modular conveying device, the conveying device comprises a conveying means which is arranged transverse to the main conveying direction and has an input location and an output location, wherein the input location is positioned in an additional first transfer position and wherein the output location of the swivelable and/or length-adjustable main conveying means is positioned in the said additional first transfer position. This advantageous configuration of the invention serves in particular for sorting out defective, bad, iron-containing, damaged or similar products detected by means of detection means so that these products can be immediately ejected from the product flow. If a plurality of conveying means are interconnected in series in a modular manner it can be sufficient if only the first conveying device in the main conveying direction has a telescopically changeable main conveying means and an additionally arranged conveying means in the transverse direction because a product inspection is performed, e.g., only at the first conveying device.

[13] In a further embodiment variant of the modular conveying device, the input location of the main conveying means of a further conveying device is modularly connected to the first transfer position. Thus, a plurality of modular conveying devices are interconnected in series, wherein each device is provided for rearranging, temporarily storing and loading at least one packaging machine. As a result, a production line can be implemented in a cost-effective manner and on a small floor space. However, usually, a temporary storage having revolving gondolas for receiving and discharging products is arranged at the end of a production line so as to be able, in particular in the event of a failure of all packaging machines, to collect all produced product rows.

[14] In a further embodiment variant of the conveying device it is possible that during the operation of the production plant, disordered rows of products or rows with bad products can be ejected from the product flow by means of a retractable belt catch and redirected to a processing station, e.g. a chocolate melting machine or into a waste container, wherein the respective transverse row is transferred onto a transverse conveying means specifically provided for this case. Said retractable belt catch of the main conveying means is equipped with an independently controllable drive provided for this purpose. The main conveying means can be implemented, e.g. as a vertically swivelable telescopic belt conveyor.

Advantageously, rearranging products by means of a modular conveying device is done in such a manner that by means of the swivelable main conveying means, at the input location of the latter, products are accepted by a production station, that the products are conveyed in the main conveying direction to the output location of the main conveying means, that the output location is positioned at one of a plurality of first transfer positions, wherein the corresponding input location of a transverse conveying means is positioned on the same transfer position, that the transverse conveying means is stopped for accepting the products from the main conveying means, that after completed transfer of the products, the output location of the main conveying means is positioned by swiveling into another transfer position, that the input location of the collecting conveying means is positioned on the second transfer position of the transverse conveying means loaded with products, wherein the transverse conveying means is activated for unloading the products, and wherein the products are transferred to the collecting conveying means and that after completed transfer of the products, the transverse conveying means is stopped again.

Advantageously, rearranging products by means of a modular conveying device is also done in such manner that by means of the swivelable main conveying means of a modular conveying device, products are fed to at least two input locations of the transverse conveying means, which input locations are positioned transverse to the main conveying direction in the transfer positions, wherein for dispensing the products temporarily stored on a transverse conveying means, the input location of each collecting conveying means is positioned with the corresponding transfer position so as to continuously feed the products in a sequence of products adjoined in a row from a corresponding transverse conveying means to a processing station.

The invention is explained in more detail hereinafter by means of exemplary embodiments illustrated in the drawings. Further essential features and advantages arise in this connection from the drawings and the description thereof.

FIG. 1 shows a simplified side view of the modular conveying device according to the invention, wherein the product rows are accepted from the left via an input edge or transfer edge onto a distributing conveyor and are alternately transferred by the latter onto the one of two transverse conveying means or onto a conveying means for processing the overflow or onto a conveying means for discharging of bad product rows;

Figure 12:
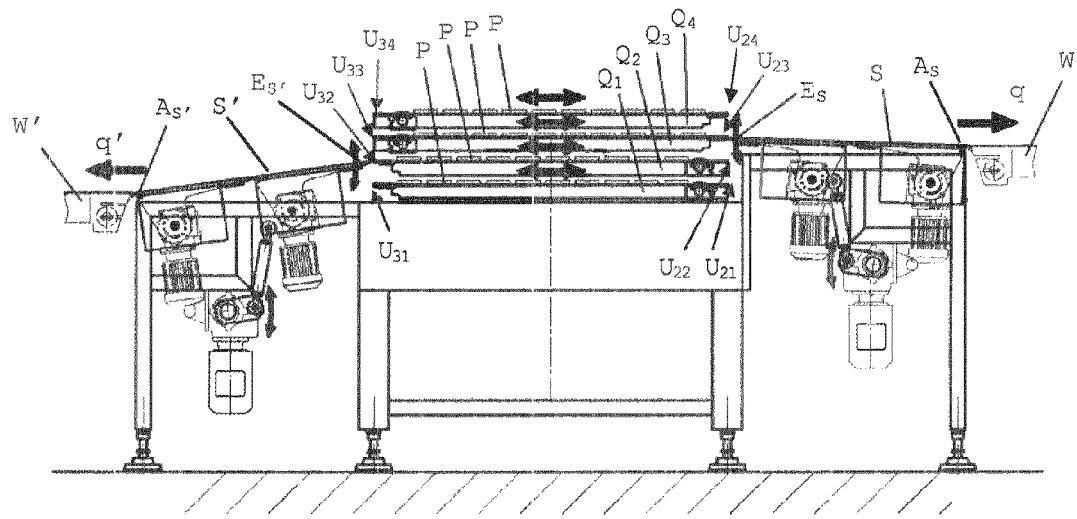

FIG. 12 shows in one embodiment variant of the modular conveying device in particular four transverse conveying means which are configured to be reversibly drivable wherein in each case the two lower transverse conveying means can transfer the temporarily stored product rows to the one collecting conveying means and wherein the two upper transverse conveying means can transfer the temporarily stored product rows to another collecting conveying means.

Figure 1:
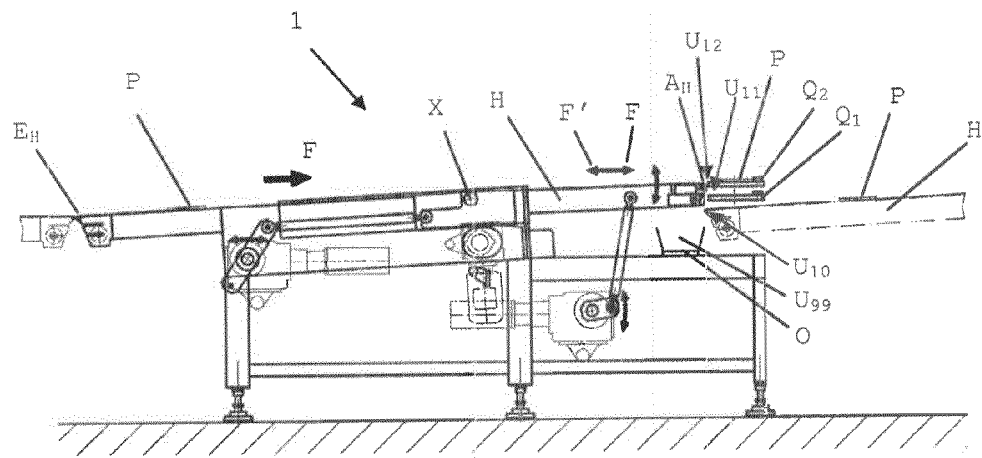

FIG. 1 illustrates a modular conveying device designated by the reference number 1, comprising a main conveying means H for conveying products P in a main conveying direction F between an input location $E_H$ and an output location $A_H$ of the main conveying means H. Here, the output location $A_H$ of the main conveying means H can be swiveled between two vertically arranged first transfer positions $U_{10}$, $U_{11}$. The modular conveying device comprises a transverse conveying means $Q_1$ for accepting the conveyed products P and likewise comprises an input location $E_{Q1}$ and an output location $A_{Q1}$, wherein the input location $E_{Q1}$ of the transverse conveying means $Q_1$ is positioned in one of the two first transfer positions $U_{11}$. The output location $A_{Q1}$ of the transverse conveying means is positioned in a second transfer position $U_{21}$. The output location ($A_H$) of the main conveying means H can be swiveled between at least one additional first transfer position $U_{12}$, $U_{13}$, ... and the said two first transfer positions $U_{10}$, $U_{11}$, wherein each additional first transfer position $U_{12}$, $U_{13}$, ... is positioned at in each case one input location $E_{Q2}$, $E_{Q3}$, ... of an additional transverse conveying means $Q_2$, $Q_3$, ... . The respective additional output locations $A_{Q2}$, $A_{Q3}$, ... of the additional transverse conveying means $Q_2$, $Q_3$, ... are positioned in additional transfer positions $U_{22}$, $U_{23}$, ... arranged vertically to the said second transfer position $U_{21}$. The conveying device comprises a collecting conveying means S having an input location $E_S$ and an output location $A_S$, wherein the collecting conveying means can be positioned selectively between the said transfer positions $U_{21}$, $U_{22}$, ... of the transverse conveying means $Q_1$, $Q_2$, ... in order to accept products P temporarily stored on a transverse conveying means. The swivel axis X of the main conveying means H, which swivel axis extends transverse to the main conveying direction F, is preferably arranged approximately at half length of the conveying means H. However, the axis X can also be arranged in the region of the input edge or the input location $E_H$. In the first case, the section of the main conveying means H between the input location $E_H$ and the axis X is thus arranged in a stationary or rigid manner. This has the advantage that, e.g., metal detectors, cameras or similar detection means can be rigidly arranged. In the second case, the entire main conveying means H would be swivelable. Moreover, the main or distributing conveying means can be implemented as a length-adjustable conveying means. Thus, the output location $A_H$ can be positioned vertically as well as horizontally within a determinable range of action. By means of the main conveying means H, the products can be alternately temporarily stored on a plurality of transverse conveying means which quasi serve as temporary deposit locations. By temporarily storing for a short time, a decoupling from a production cycle of a production plant arranged upstream of the conveying device 1 can be achieved, wherein said production plant is not illustrated in FIG. 1. The collecting conveying means S is configured, e.g., as a belt conveyor. Usually, the transport speed of the collecting conveyor is different from the transport speed of the main conveying means. By means of the said decoupling, the transverse rows of products can now be rearranged into a continuous product flow. The transverse conveying means $Q_1$, $Q_2$, ... are configured as conveying means arranged vertically spaced apart from each other for conveying the temporarily stored products P. Said conveying means are preferably arranged in a stationary or rigid manner. The conveying means H arranged downstream in the main conveying direction F can also be configured, e.g., as a swivelable belt. At least two transverse conveying means $Q_1$, $Q_2$ are arranged transverse to the main conveying direction F of the main conveying means H. At least one swivelable collecting conveying means S is arranged downstream for alternately receiving the temporarily stored products P from the transverse conveying means $Q_1$, $Q_2$. The collecting conveying means S can consist of a plurality of conveying means, e.g. conveyor belts. These belts can be driven independently of each other. Thus, the distance between the individual products P during the transfer from one to the next belt can be adjusted. Via the collecting conveying means S, the products P arrive at a forwarding conveying means which usually leads to a packaging machine. Each transverse conveying means preferably has a limit stop means so that the products slid onto the conveying means are slowed down in the main conveying direction H. The transverse rows of products P which are transported coming from the production plant in the main conveying direction F have the transport speed of the distributing conveying means H when getting onto the transverse conveying means. The products P are stopped by the limit stop and are prevented from falling off the transverse conveying means. At the same time, the limit stop also causes an alignment of the products P so that they are provided in an ordered manner so as to be subsequently transferred to the collecting conveying means S. At the latest when the row of products P is deposited on a transverse conveying means, the belt catch of the main conveying means H is set to the height of said transverse conveying means or a free transverse conveying means. The output location $A_H$ of the main conveying means H is preferably slightly higher or has the same height as the belt or the deposit surface of the corresponding transverse conveying means. Between the belt catch of the distributing conveying means H and the transverse conveying means there can be a small gap. However, since the products P are transported with a certain speed across said gap, there is no risk that the products possibly could get stuck therein. Advantageously, the main conveying means H can be configured as length-adjustable belt so that the belt catch or the output location $A_H$ of the main conveying means H can be retracted in the direction F' counter to the main conveying direction F. Said small gap described above can then be individually minimized for each conveying means to be loaded. This property is in particular utilized to sort out faulty product rows and to transfer them to the conveying means O. The conveying means O is preferably implemented as a transverse discharge belt which is configured transverse to the main conveying direction F. By moving backwards and, at the same time, lowering the main conveying means H, the belt catch is positioned in the transfer position $U_{99}$ and the faulty product row is transferred to the belt O and thus sorted out. The conveying means O can also be configured as a deposit surface, tilting element or the like and is advantageously arranged underneath the distributing conveying means H. It can also be configured as reversible conveyor belt that can be driven in forward and backward direction. In this illustration, the collecting conveying means S has two endlessly circulating conveyor belts which, however, are arranged to be swivelable by a common drive. The two belts serve in particular to form individual gaps between the individual products. Said gaps can be detected by means of detection means, e.g. light barriers, and consequently, the two belts can be driven with speeds which are different relative to each other.

Figure 2:
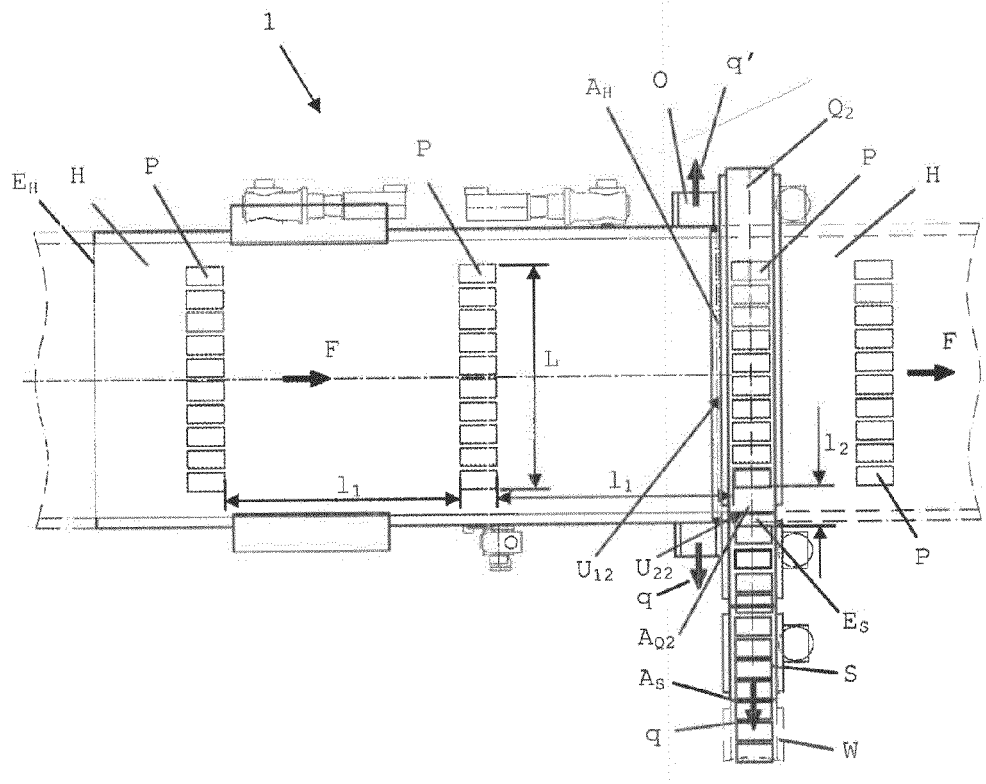
FIG. 2 shows a top view of a modular conveying device illustrated in a simplified form, wherein products are temporarily stored on a transverse conveying means.

FIG. 2 shows a top view of a modular conveying device 1 illustrated in a simplified form. Products P are temporarily stored on a transverse conveying means $Q_2$. By means of the collecting conveying means S arranged in a vertically swivelable manner, the products P are transported by the transverse conveying means $Q_2$ in the direction q transverse to the main conveying direction F. Each collecting conveying means or each collecting conveyor S can consist of, e.g., two separate and individually drivable, endlessly circulating belts. Provided in terms of mechanics per collecting conveying means S is in each case one lifting or swiveling means consisting of a drive as well as crank means or lever means which can be moved by the drive. The swiveling device can also be implemented, e.g., with hydraulic means. Thus, if a collecting conveyor has, e.g., two belts, said belts are swiveled together about the one swivel axis so that the two belts always form one plane. When all transverse conveying means Q1, Q2, . . . are loaded with products P, the subsequent transverse rows of products P are transferred to the conveying means H of a subsequent further modular conveying device. The rows of products P on the main conveying means or distributing conveying means H have, e.g., a distance $l_1$ from each other. This distance depends on the production cycle of a baking machine, chocolate molding machine or the like. By rearranging the products P onto the transverse discharge belts Q1, Q2, . . . , a decoupling from this cycle can be achieved. Through said decoupling and the row formation by means of the transverse discharge belts Q1, Q2, . . . and the collecting conveying means S, a synchronization with the cycle of the non-illustrated processing station V is achieved, which processing station receives the now continuous row of products P for further processing. Between the individual transverse rows of products, there is a distance $l_2$. By means of a gap closing belt or collecting conveyor S it is now achieved that said distance $l_2$ is also present between the last product of a preceding transverse row and the first product of one of these succeeding transverse rows. The processing station V is usually a packaging machine, a cooling unit or the like. The conveying means O can be reversibly driven in the directions q and q' and is used to eject defective products P. For this purpose, the output location $A_H$ of the main conveying means is retracted and lowered so that the row of products is deposited in the conveying means or falls down. Subsequently, the output location $A_H$ of the main conveying means H is positioned again on the input location $E_{Q1}$, $E_{Q2}$, . . . of an empty transverse conveying means in order to push a succeeding row of products onto said corresponding transverse conveying means.

Figure 3:
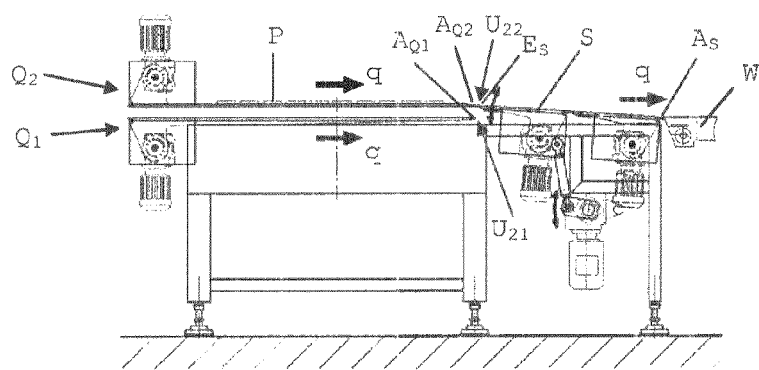
FIG. 3 shows a further side view of the modular conveying device, wherein in particular two transverse conveying means and two collecting conveying means are shown.

FIG. 3 shows a further side view of the modular conveying device 1, wherein in particular two transverse conveying means $Q_1$, $Q_2$ and one collecting conveying means S are shown. The collecting conveying means S which preferably comprises two endless belts is mounted to be swivelable about an axis extending transverse to the transport direction q and is height-adjustable by means of a lifting or swiveling device for the purpose of positioning in the transfer positions $U_{21}$, $U_{22}$. The collecting conveying means S can have at least one length-adjustable belt so as to minimize the gap between input location $E_s$ of the collecting conveying means and the corresponding output location $A_{Q1}$, $A_{Q2}$, . . . of a transverse conveying means. Advantageously, the height of the swivel axis of the collecting conveyor S is arranged in such a manner that the upward travel and the downward travel of the transfer edge are approximately equal. This has an advantageous effect on the gap formation between two rows of products which have been picked up one after the other by two transverse conveying means. The products are transported in the direction q and transferred to a forwarding belt W.

Figure 4:
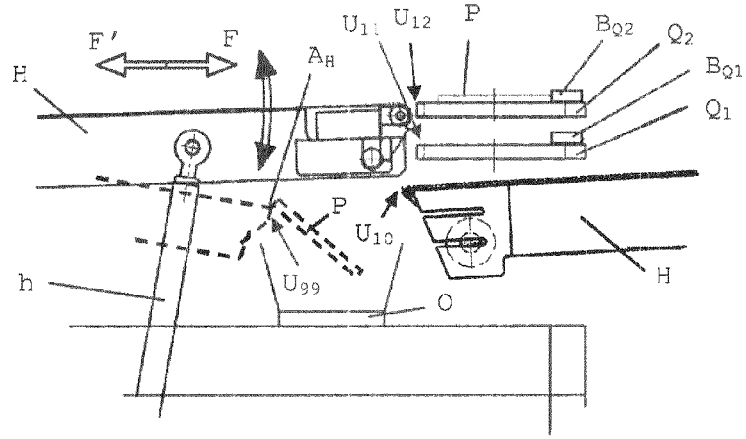
FIG. 4 shows a detailed view of FIG. 1, wherein the belt catch or transfer edge of the distributing conveying means is aligned with the height of the upper transverse conveying means on which a row of products is temporarily stored.

FIG. 4 shows a detailed view of FIG. 1, wherein the belt catch or output location $A_H$ of the main conveying means H is aligned with the height of the upper transverse conveying means $Q_2$ on which a row of products P is temporarily stored. By means of a lever arm h of a lifting or swiveling means of the device according to the invention, the distributing conveying means H can be swiveled, wherein the output location $A_H$ can be adapted to the different levels or first transfer positions $U_{10}$, $U_{11}$, . . . of the conveying means. $U_{10}$ is the transfer position in which the input location $E_H$ of a conveying means, for example a main conveying means of a further conveying device 1, arranged downstream in the conveying direction F is arranged in a modular manner. The main conveying means H is illustrated by the dashed line in the lowered and retracted position, wherein a product P is fed onto the conveying means O. In this case, the output location $A_H$ is positioned in the transfer position $U_{99}$. The conveying means O serves in particular for the purpose of sorting out bad products. The conveying means O can feed the defective products P to a non-illustrated trash can, a processing station or the like.

Figure 5:
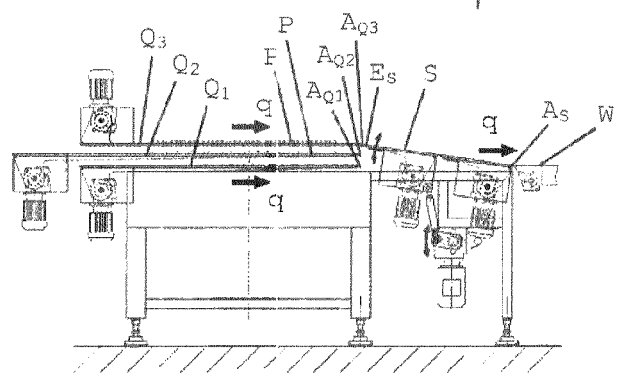
FIG. 5 shows an embodiment of the modular conveying device illustrated in simplified form in a side view, wherein three transverse conveying means are present which transfer each of the temporarily stored product rows to the collecting conveying means arranged laterally to the main conveying direction.

FIG. 5 shows an embodiment variant of the modular conveying device 1 illustrated in a simplified manner in a side view, wherein three transverse conveying means $Q_1$, $Q_2$, $Q_3$ are present which transfer each of the temporarily stored product rows to the collecting conveying means S arranged laterally to the main conveying direction F. The collecting conveying means S has a swiveling range which is designed such that products P can be accepted from all three transverse conveying means $Q_1$ to $Q_3$. In this illustration, the collecting conveying means S has two endlessly circulating conveyor belts which, however, are arranged to be swivelable by a common drive so that the two belts always form one plane. The two belts serve in particular for the individual gap formation between individual products. The reference numbers $A_{Q1}$ to $A_{Q3}$ designate output locations of corresponding transverse conveying means $Q_1$ to $Q_3$. The products are usually transported in the direction q.

Figure 6:
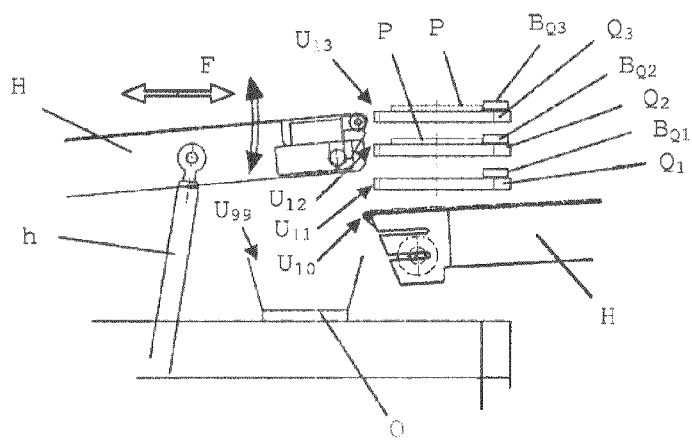
FIG. 6 shows a detail of FIG. 5 in another side view, wherein three transverse conveying means are present and wherein products are temporarily stored on the two upper transverse conveying means in order to transfer said products to the non-illustrated collecting conveying means.

FIG. 6 shows a detail of FIG. 5 in another side view, wherein three transverse conveying means $Q_2$, $Q_3$, $Q_3$ are present and wherein on the two upper transverse conveying means $Q_2$, $Q_3$, products P are temporarily stored in order to transfer said products to the non-illustrated collecting conveying means S. The reference numbers $U_{11}$ to $U_{13}$ designate transfer positions in which the input locations of the corresponding transverse conveying means $Q_1$, $Q_2$, $Q_3$ are positioned. The reference number $U_{10}$ designates the transfer position in which, e.g., the input location of the main conveying means H of a subsequent conveying device 1 is arranged in a modular manner. The reference numbers $B_{Q1}$ to $B_{Q3}$ show limit stop means so as to prevent products transferred from the main conveying means H to the transverse conveying means $Q_1$, $Q_2$, $Q_3$ from falling off. The reference number h designates, e.g., a push rod, a lever etc. of a drive by means of which the output location $A_H$ of the main conveying means H can be positioned.

Figure 7:
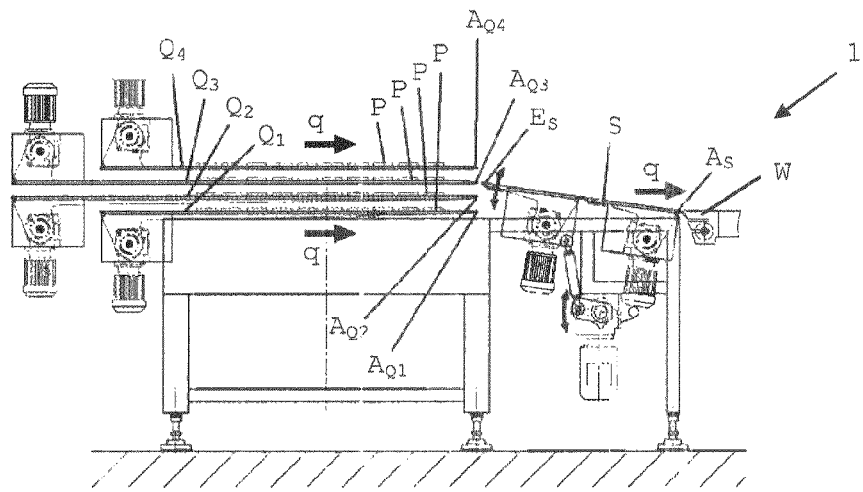
FIG. 7 shows an embodiment of the modular conveying device illustrated in simplified form in a side view, wherein four transverse conveying means are present which transfer each of the temporarily stored product rows to the collecting conveying means arranged laterally to the main conveying direction.

FIG. 7 shows an embodiment variant of the conveying device 1 illustrated in a simplified form in a side view, wherein four transverse conveying means $Q_1$ to $Q_4$ are present which transfer each of the temporarily stored product rows to the collecting conveying means S. The collecting conveying means S has a swiveling range which is sufficient to accept products P from all four transverse conveying means $Q_1$ to $Q_4$. In this illustration, the collecting conveying means S has two endlessly circulating conveyor belts which, however, are arranged to be swivelable by a common drive. The two belts serve in particular for the individual gap formation between individual products. The reference numbers $A_{Q1}$ to $A_{Q4}$ designate output locations of corresponding transverse conveying means $Q_1$ to $Q_4$. The products are usually transported in the direction q.

Figure 8:
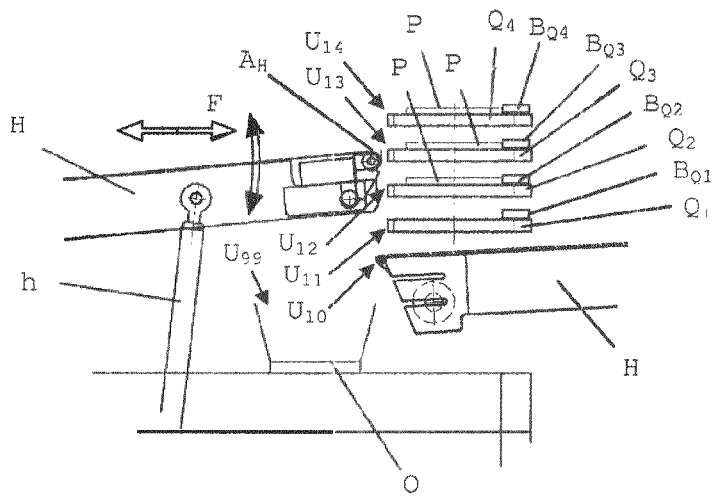
FIG. 8 shows a detail of FIG. 7 in another side view, wherein the belt catch of the distributing conveying means is aligned with the height of the transverse conveying means which is second from the top.

FIG. 8 shows a detail of FIG. 7 in another side view, wherein the output location $A_H$ of the main conveying means H is aligned with the height of the transverse conveying means $Q_2$ which is second from the top. The reference numbers $B_{Q1}$ to $B_{Q4}$ show limit stop means so as to prevent products transferred from the main conveying means H to the transverse conveying means from falling off. At the same time, the products P are aligned in the main conveying direction when abutting against the limit stop means. The limit stop means can be formed as an elongated beam, rod or the like and extends at least over the length L illustrated in FIG. 2. The reference numbers $U_{11}$ to $U_{14}$ designate the first transfer positions which are predetermined by the vertical and horizontal position of the transverse conveying means. By means of swiveling, the main conveying means H is able to position the output location as well as $A_H$ on all transfer positions. The position $U_{99}$ can be reached in that the main conveying means H is swiveled downward and retracted. In this position, e.g., inferior products can be ejected so that they are not transferred to a packaging station. Reference number $U_{10}$ designates the transfer position in which, e.g., the input location of the main conveying means H of a subsequent conveying device 1 is arranged in a modular manner.

Figure 9:
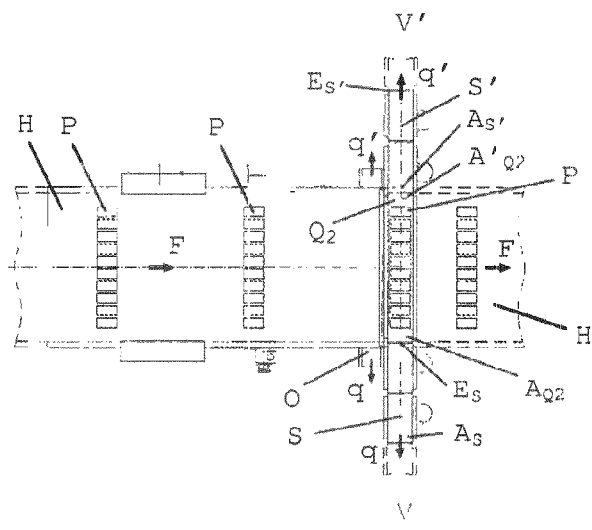
FIG. 9 shows a top view of the modular conveying device according to the invention, wherein on the right and left, viewed in the main conveying direction of the products, in each case collecting conveying means are arranged which can accept the product rows from the transverse conveying means.

FIG. 9 shows a top view of the modular conveying device 1 according to the invention, wherein on the right and the left side in the main conveying direction F of the products P, two collecting conveying means S, S' are arranged which can accept the product rows P from the plurality of transverse conveying means $Q_1$, $Q_2$ .... Reference number $A'_{Q2}$ designates a further output location of the transverse conveying means $Q_2$, while $A_{Q2}$ designates the first output location of the transverse conveying means $Q_2$. The collecting conveying means S has an input location $E_S$ and an output location $A_S$. The collecting conveying means S' in turn has an input location $E_{S'}$ and an output location $A_{S'}$. If, for example, the non-illustrated processing station V experiences a malfunction so that the transport of products P in the direction q is not possible, the device can immediately deliver the temporarily stored products by means of the reversibly operatable transverse conveying means via the collecting conveying means S' to the non-illustrated processing station V'.

Figure 10:
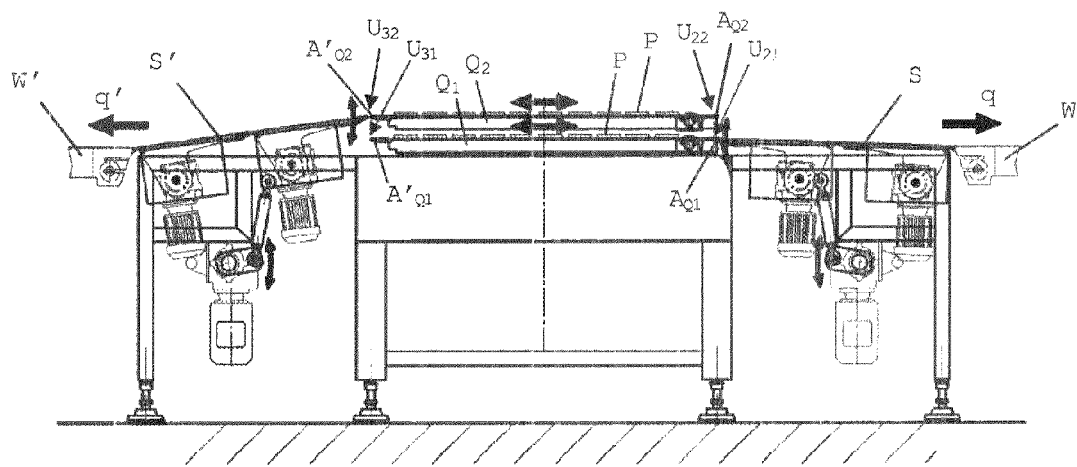
FIG. 10 shows in one embodiment variant of the modular conveying device in particular two transverse conveying means which are configured to be reversibly drivable and can transfer the product rows either to the one or the other of two collecting conveying means arranged laterally of the non-illustrated distributing conveying means.

FIG. 10 shows in one embodiment variant of the conveying device 1 in particular two transverse conveying means $Q_1$, $Q_2$ which are configured to be reversibly drivable and which can transfer products P either to the one or the other of two collecting conveying means S, S' arranged laterally on the transverse conveying means. Reference numbers W and W' designate further conveying means or forwarding belts by means of which the products P accepted by the collecting conveying means S and S', respectively, are transported to processing machines V, V' which follow in each case and are not illustrated.

Figure 11:
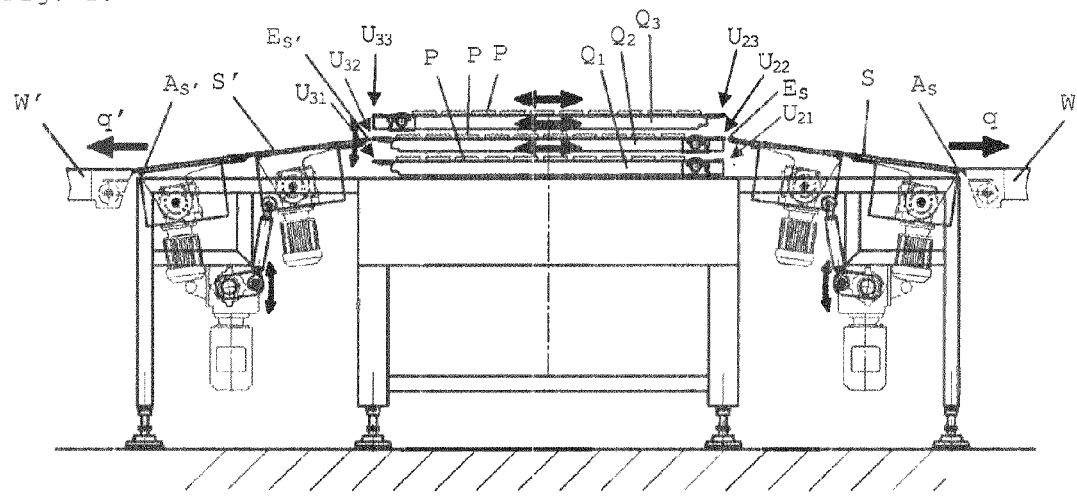
FIG. 11 shows in one embodiment variant of the modular conveying device in particular three transverse conveying means which are configured to be reversibly drivable and can transfer the product rows either to the one or the other of two collecting conveying means arranged laterally of the non-illustrated distributing conveying means.

FIG. 11 shows in one embodiment variant of the conveying device 1 in particular three transverse conveying means which are configured to be reversibly drivable and which can transfer product rows P either to the one or the other of two collecting conveying means S arranged laterally of the non-illustrated distributing conveying means H. Reference numbers W and W' designate further conveying by means of which the products P accepted by the collecting conveying means S and S', respectively, are transported to processing machines V, V' following in each case.

FIG. 12 shows in one embodiment variant of the conveying device 1 in particular four transverse conveying means $Q_1$, $Q_2$, $Q_3$, $Q_4$ which are configured to be reversibly drivable, wherein the two lower transverse conveying means $Q_1$, $Q_2$ can transfer the temporarily stored product rows P to the one collecting conveying means S' and wherein the two upper transverse conveying means $Q_3$, $Q_4$ can transfer the temporarily stored product rows P to another collecting conveying means P. Reference numbers W and W' designate further conveying means by means of which the products P accepted by the collecting conveying means S and S', respectively, are transported to processing machines following in each case. These conveying means are also designated as forwarding conveying means. However, the collecting conveying means S, S' can also be configured for the purpose of accepting products from in each case all four planes or transverse discharge belts. For selectively positioning and/or swiveling the collecting conveying means, lifting means are provided which are configured as controllable servomotors having a lever mechanism. It is also possible to provide a hydraulic drive for swiveling.

Reference list

1 Modular conveying device
$A_H$ Output location of the main conveying means H, dispensing location
$A_O$ Output location of the conveying means O, dispensing location $A_S$, $A_{S'}$ Output location of a collecting conveying means, dispensing location
$A_{Q1}, A_{Q2}, \ldots$ Output location of a transverse conveying means, dispensing location
$A'_{Q1}, A'_{Q2}, \ldots$ Second output location of a collecting conveying means, dispensing location
$E_H$ Input location of the main conveying means H
$E_O$ Input location of the conveying means O
$E_S$, $E_{S'}$ Input location of a collecting conveying means
$E_{Q1}, E_{Q2}, \ldots$ Input location of a transverse conveying means
F Main conveying direction, conveying direction
F' Opposite direction to main conveying direction
f, f' Direction
H Main conveying means, distributing conveying means
h Push rod, lever, drive
L Length
$l_1$ Distance
$l_2$ Distance
N1, N2, ... Transverse conveying means, conveying means
O Conveying means, transverse conveying means
P Product(s)
$Q_1, Q_2, Q_3, \ldots$ Transverse conveying means
q Transverse direction
q' Opposite direction to transverse direction
S, S' Collecting conveying means, gap closing belt
s, s' Direction, lifting direction, swiveling direction
$B_{Q1}, B_{Q2}, \ldots$ Limit stop means of a transverse conveying means
$U_{10}, U_{11}, \ldots$ First transfer position
$U_{21}, U_{22}, \ldots$ Second transfer position
$U_{31}, U_{32}, \ldots$ Third transfer position
V, V' Processing station, packaging machine
W, W' Conveying means, forwarding belt
X Swiveling axis, axis

The invention claimed is:

1. A modular conveying device comprising:
a main conveying means for conveying products in a main conveying direction between an input location and an output location of the main conveying means, wherein the output location of the main conveying means can be swiveled between two first transfer positions arranged vertically spaced apart from each other;
a transverse conveying means for accepting the conveyed products that likewise include an input location and an output location, wherein the input location of the transverse conveying means is positioned in one of the two first transfer positions and the output location of the transverse conveying means is positioned in a second transfer position; and
a collecting conveying means including an input location and an output location,
wherein the output location of the main conveying means is configured to be swiveled between at least one additional first transfer position and the two first transfer positions,
wherein each additional first transfer position is positioned in each case, at one input location of an additional transverse conveying means,
wherein in each case additional output locations of the additional transverse conveying means are positioned in additional transfer positions arranged vertically to the second transfer position, and
wherein the collecting conveying means is configured to be selectively positioned between the transfer positions of the transverse conveying means to accept products temporarily stored on a transverse conveying means.

2. The modular conveying device according to claim 1,
wherein each transverse conveying means includes an additional second output location,
wherein each output location is positioned in a third transfer position,
wherein the conveying device, in addition to the collecting conveying means, includes at least one further collecting conveying means having an input location and an output location,
wherein the collecting conveying means can be selectively positioned between the third transfer positions of the transverse conveying means to accept products temporarily stored on a transverse conveying means.

3. The modular conveying device according to claim 1,
wherein the products conveyed by the main conveying means are arranged in transverse rows of the length,
wherein each transverse conveying means has at least a length to receive products.

4. The modular conveying device according to claim 1, further comprising a processing station arranged downstream of each collecting conveying means and can be connected thereto.

5. The modular conveying device according to claim 1,
wherein each transverse conveying means includes an independently controllable, reversible drive to convey the temporarily stored products correspondingly in the direction of the first transfer position or the second transfer position.

6. The modular conveying device according to claim 1,
wherein each transverse conveying means can be operated cyclically,
wherein within an idle cycle, products transferred by the main conveying means can be temporarily stored, and
wherein within a conveying cycle, the temporarily stored products can be fed to the corresponding collecting conveying means.

7. The modular conveying device according to claim 1,
wherein at least one of the main conveying means, each transverse conveying means, and each collecting conveying means is configured as a circulating endless band conveyor or belt conveyor.

8. The modular conveying device according to claim 1, further comprising control means by which the drive means of the main conveying means and/or each transverse means and/or each collecting conveying means can be controlled separately.

9. The modular conveying device according to claim 1, wherein the transverse conveying means is arranged transverse to the main conveying direction.

10. The modular conveying device according to claim 1, comprising two, three, or four transverse conveying means.

11. The modular conveying device according to claim 1, wherein the main conveying means is configured in a length-adjustable manner for vertically and/or horizontally positioning at a corresponding first transfer position.

12. The modular conveying device according to claim 11,
wherein the conveying device includes a conveying means arranged transverse to the main conveying direction and includes an input location and an output location,
wherein the input location is positioned in an additional first transfer position, and
wherein the output location of the swivelable and/or length-adjustable main conveying means is positioned in the additional first transfer position.

13. The modular conveying device according to claim 1, wherein the input location of the main conveying means of a further conveying device is modularly connected to the first transfer position.

14. A method for rearranging products by a modular conveying device according to claim 1,
- wherein by the swivelable main conveying means, at the input location of the main conveying means, products are accepted by a production station,
- wherein the products are conveyed in the main conveying direction to the output location of the main conveying means,
- wherein the output location is positioned at one of a plurality of first transfer positions,
- wherein the corresponding input location of a transverse conveying means is positioned on the same transfer position,
- wherein the transverse conveying means is stopped for accepting the products from the main conveying means,
- wherein after completed transfer of the products, the output location of the main conveying means is positioned by swiveling into another transfer position,
- wherein the input location of the collecting conveying means is positioned on the second transfer position of the transverse conveying means loaded with products,
- wherein the transverse conveying means is activated for unloading the products, and
- wherein the products are transferred to the collecting conveying means,
- wherein after completed transfer of the products, the transverse conveying means is stopped again.

15. A method for rearranging products by a modular conveying device according to claim 1,
- wherein by the swivelable main conveying means of a modular conveying device, products are fed to at least two input locations of the transverse conveying means, which input locations are positioned transverse to the main conveying direction in the transfer positions,
- wherein, for dispensing the products temporarily stored on a transverse conveying means, the input location of each collecting conveying means is positioned with the corresponding transfer position so as to continuously feed the products in a sequence of products adjoined in a row from a corresponding transverse conveying means to a processing station.

* * * * *